UNITED STATES PATENT OFFICE 2,490,481

STABILIZED DDT SOLUTIONS

Walter A. Schulze and John Carpenter Hillyer, Bartlesville, Okla., assignors to Phillips Petroleum Company, a corporation of Delaware No Drawing. Application February 10, 1947,
Serial No. 727,730

6 Claims. (Cl. 167—42)

This invention relates to stabilized, concentrated solutions of DDT [2,2-bis (parachlorophenyl)-1,1,1-trichloroethane] and to methods and materials for their preparation. In one particular aspect it relates to methods for preventing the separation of insoluble precipitates from concentrated solutions of DDT under low temperature conditions.

The term DDT in general commercial usage and as used in this specification refers to the chemical compound 2,2-bis (parachlorophenyl)-1,1,1-trichloroethane. This compound is well known to be highly effective as an insecticide. It is described in U. S. Patent No. 2,329,074 to Muller, reissued as Reissue No. 22,700. Muller discloses the use of DDT in solution in alcohol, petroleum or similar solvents or in aqueous emulsion. He suggests solutions or emulsions containing about 5 per cent DDT. Siegler, in U. S. Patent 2,358,942 teaches the use of water or other compatible liquid in the preparation of emulsions of DDT having low concentration. It has become common practice to employ emulsions or solutions containing DDT in low concentration as insecticides.

The advantages of concentrated solutions for purposes of storage and transportation are obvious. Since the solvents necessary for dilution or emulsification prior to use are usually obtainable at the location of use at low cost it has become common commercial practice to manufacture DDT solutions having high concentration and to dilute such concentrates prior to use. Petroleum solvents are commonly used in the preparation of these concentrates. Almost any desired cut of petroleum products could be used as a solvent for DDT but those composed chiefly of paraffins are less desirable as the solubility of DDT is comparatively low in these materials. Fractions containing cyclics and aromatics are preferred, since DDT is more soluble in such materials.

One preferred solvent for preparing concentrated DDT solutions is a petroleum fraction known as gas oil and further characterized by boiling in the range from about 385° F. to about 550° F., having a flash point of not less than 125° F. and having an aniline number of not more than 25° F. Solutions containing from 25 to 30 per cent by weight of DDT are easily prepared by the use of such gas oil at ordinary room temperatures of about 60° to 80° F.

The solubility of DDT in petroleum solvents, as would be expected, becomes less as the temperature decreases. A serious disadvantage of concentrated DDT solutions arises from this fact, since low temperatures such as are often encountered in freight transportation in the winter or in storage in unheated warehouses often decrease the solubility of DDT enough to cause a considerable proportion thereof to precipitate from solution and such precipitated DDT does not readily dissolve again when the mixture is warmed to normal room temperatures. The observed phenomenon of precipitation of DDT in excess of the quantity required to form a saturated solution at low temperature is peculiar and distinctive in that a large quantity is not precipitated as soon as the saturation temperature is passed, or even after "seeding" by initial crystal formation occurs, but the precipitation is very slow and may continue over a great many hours. The reason why the resulting precipitate does not again dissolve upon warming the mixture to room temperature is not known, but is probably connected in some way with the slowness of its formation.

Whatever the cause may be, it is known that DDT does precipitate from concentrated solutions in petroleum solvents under the influence of cold and that the resulting precipitate is difficult to redissolve in the solvent. It is obvious that the insecticidal effect of a mixture of DDT solution and crystals will not be uniform and that crystals present therein may clog dispensing equipment such as spray nozzles. DDT solutions which are stable and which contain 25 to 30 per cent DDT are greatly desired in commerce. A method for maintaining DDT in solution at low temperatures or for causing precipitated DDT to be easily redissolved would be a great advance in the art.

It is an object of our invention to provide solutions of DDT in petroleum solvents which are stabilized against precipitation of DDT at low temperatures.

Another object is to provide additives for concentrated solutions of DDT in petroleum solvents which stabilize such solutions against precipitation of DDT at low temperatures.

Anoher object is to provide a method for decreasing precipitation of DDT from solution in petroleum solvents at low temperatures.

Another object is to provide a method for causing crystals of DDT, formed from solution in a petroleum solvent, to be easily soluble in said solvent.

Other objects and advantages will become apparent to those skilled in the art as this disclosure proceeds.

We have discovered that the addition of a minor proportion of gum guaiac, gum benzoin or a mixture of said gums to a solution of DDT in a petroleum solvent results in a solution that is stabilized against precipitation of DDT at low temperatures—that is, the length of time such solution may be subjected to temperatures low enough to cause it to be supersaturated without separation of DDT crystals is greatly increased. When crystals finally separate they are formed in small quantity only, remain suspended in the solution and quickly redissolve when the mixture is warmed to ordinary room temperatures, or about 70° F.

The gums are used in concentrations varying from about 0.05 per cent by weight up to saturation of the solution with gum, which is usually equivalent to about 0.10 per cent by weight at 70° F. There are no special procedures necessary for dissolving the gum. Merely stirring or agitating the gum with petroleum solvent is sufficient although any other equivalent method common in the art of preparing solutions may be used. The gum may be dissolved in the solvent prior to dissolving DDT therein, the DDT may be dissolved in the solvent prior to adding the gum or both DDT and gum may be dissolved simultaneously. All that is necessary is to have the prepared DDT solution contain the stated proportion of gum.

The mechanism by which these gums stabilize supersaturated solutions of DDT is unknown, but this property is exhibited by very few substances.

Such materials as gelatin, casein, purified rosin, beeswax, acryloid resin, HF soluble oil, "Paraflow," "Santopour," etc., do not inhibit the separation of heavy insoluble precipitates from such solutions in a relatively short time.

The following examples are given in order to illustrate the advantages gained in two embodiments of our invention. Our invention, however, is not to be considered as limited to the particular petroleum solvent shown therein, nor to the concentration of DDT in the solutions of the examples, nor to the concentration of gum therein, but it is limited only by the scope of the attached claims.

Example I

Solutions were prepared containing 30 weight per cent of technical grade DDT in a gas oil having the following specifications:

| | |
|---|---|
| Boiling range, °F | 414–512 |
| Flash point, °F | 193 |
| Kauri-butanol No | 107.6 |
| Aniline No., °F | 14.2 |
| Refractive index, 20° C | 1.5376 |
| API gravity, 60° F | 20.2 |
| Color (NPA) | 1½ |

A 10 cc. sample of such solution was placed in a ⅝" diameter glass test tube, lightly corked, and the test tube was suspended in a water-glycol bath maintained at −10° F. ±1° F. A motor driven stirrer caused some vibration in the sample and the test tube was picked up for observation at intervals, causing the solution to be tipped back and forth in the tube. There was no other agitation while in the bath. This sample was clear when prepared at room temperature and remained clear for approximately 15 hours at −10° F. At the end of 16 hours at −10° F. a trace of crystalline material appeared. The quantity of crystalline material increased very slowly until approximately ½" of material had accumulated in the bottom of the test tube at the end of 88 hours. At the end of 160 hours at −10° F. crystalline material filled the entire volume occupied by the solution, and it was impossible to pour off the solution. Since this crystalline material did not readily dissolve again when the mixture was warmed to room temperature it was evident that the usefulness of the solution had been greatly impaired.

Example II

To a 30 per cent solution of DDT, prepared as described in Example I, gum guaiac was added in amount sufficient to saturate the solution with gum. The quantity of gum required was approximately 0.10 per cent by weight. A 10 cc. sample of the resulting solution was placed in a ⅝" test tube and was maintained at −10° F. in the manner described in Example I. After this sample had remained at −10° F. for 20 hours a cloudiness appeared which seems to be a suspension of very fine crystals in negligible amount. For a period of 160 hours there was no noticeable increase in the amount of crystalline material in suspension and no accumulation of precipitate in the bottom of the test tube occurred. The crystalline material present quickly redissolved when the solution was warmed to about 70° F.

Example III

To a 30 per cent DDT solution prepared as described in Example I was added approximately 0.10 per cent by weight of gum benzoin. This quantity of gum benzoin was sufficient to saturate the solution therewith. A 10 cc. sample of the resulting solution of DDT and gum benzoin was maintained at −10° F. in the manner descibed in Example I. After this sample had remained at −10° F. for 16 hours a suspension of very fine crystals in negligible amount appeared. At the end of 144 hours at −10° F. there was a very slight accumulation of precipitate in the bottom of the test tube. These crystals were quickly dissolved by warming the mixture to room temperature.

The stabilizing materials of our invention are cheap and readily available. The addition of these materials in very small concentration to a solution of DDT in a petroleum solvent causes the solution to be stable, for all practical purposes, for a period of 140 hours or longer at −10° F. At temperatures slightly above −10° F. the period of stability is greatly extended.

The suspension of fine crystals which separates after long exposure of such solutions to low temperatures readily dissolves when the mixture is again warmed to ordinary room temperatures, and therefore does not adversely affect the use of the solution. It is probable that this suspended solid material is a portion of the gum itself or some impurity.

These stabilized solutions are in general protected against temporary conditions of cold in transportation or storage in unheated warehouses. The concentrated solutions of DDT available heretofore, as illustrated in Example I, are not satisfactory for use in northern climates, as such solutions may be permanently injured by being subjected to low temperatures for a period of one day or more.

We claim:

1. A solution of DDT in a petroleum solvent containing sufficient DDT to be supersaturated at −10° F. and also containing a gum selected from the group consisting of gum guaiac, gum benzoin and mixtures thereof in proportion in the range from 0.05 per cent by weight up to saturation of the solution with gum.

2. A solution of DDT in a petroleum solvent containing sufficient DDT to be supersaturated at —10° F. and also containing from 0.05 to 0.10 weight per cent of a gum selected from the group consisting of gum guaiac, gum benzoin and mixtures thereof.

3. An insecticide solution comprising DDT in proportion in the range from 25 to 30 weight per cent, at least one gum selected from the group consisting of gum guaiac, gum benzoin and mixtures thereof in proportion in the range from 0.05 to 0.10 weight per cent in a petroleum solvent, said solvent boiling in the range from 385° to 550° F., having a flash point of not less than 125° F. and having an aniline number of not more than 25° F.

4. The solution of claim 3, in which the gum is gum guaiac.

5. The solution of claim 3, in which the gum is gum benzoin.

6. An insecticide solution comprising 30 weight per cent of DDT, 0.1 per cent by weight of gum guaiac, and a petroleum solvent characterized by boiling in the range from 414° F. to 512° F., having a flash point of 193° F., a kauri-butanol number of 107.6, an aniline number of 14.2° F., a refractive index at 20° C. of 1.5376, an API gravity at 60° F. of 20.2, and a color (NPA) of 1½, said insecticide solution being more stable to precipitation of DDT therefrom at a temperature of —10° F. than a corresponding insecticide solution consisting of the same amount of DDT dissolved in the same petroleum solvent.

WALTER A. SCHULZE.
JOHN CARPENTER HILLYER.

REFERENCES CITED

The following references are of record in the file of this patent:

UNITED STATES PATENTS

| Number | Name | Date |
| --- | --- | --- |
| 1,819,953 | Funk | Aug. 18, 1931 |
| 2,011,428 | Voorhees | Aug. 13, 1935 |
| 2,046,181 | Remy | June 30, 1936 |
| 2,058,200 | Wotherspoon | Oct. 20, 1936 |

FOREIGN PATENTS

| Number | Country | Date |
| --- | --- | --- |
| 547,871 | Great Britain | Sept. 15, 1942 |